(12) United States Patent
Thomas et al.

(10) Patent No.: US 8,989,929 B2
(45) Date of Patent: Mar. 24, 2015

(54) DEVICE FOR REDUCING THE LIKELIHOOD OF DAMAGE TO A TRAILING CABLE

(75) Inventors: Terry M. Thomas, Franklin, PA (US); Douglas F. Anderson, Cochranton, PA (US); Darin M. Sutton, Guys Mills, PA (US); David K. Herdle, Franklin, PA (US); Phillip E. Smith, Johannesburg (AP)

(73) Assignee: Joy MM Delaware, Inc., Wilmington, DE (US)

( * ) Notice: Subject to any disclaimer, the term of this patent is extended or adjusted under 35 U.S.C. 154(b) by 618 days.

(21) Appl. No.: 12/692,145

(22) Filed: Jan. 22, 2010

(65) Prior Publication Data

US 2011/0184597 A1 Jul. 28, 2011

(51) Int. Cl.
| | | |
|---|---|---|
| *G05B 19/04* | (2006.01) | |
| *G05B 19/18* | (2006.01) | |
| *G05B 15/00* | (2006.01) | |
| *G05B 19/00* | (2006.01) | |
| *B60L 9/00* | (2006.01) | |
| *G05D 1/00* | (2006.01) | |
| *G06F 17/00* | (2006.01) | |
| *H02G 11/02* | (2006.01) | |
| *B65H 75/42* | (2006.01) | |
| *B65H 75/44* | (2006.01) | |

(52) U.S. Cl.
CPC ........ *H02G 11/02* (2013.01); *B60L 9/00* (2013.01); *B65H 75/425* (2013.01); *B65H 75/4484* (2013.01); *B65H 75/4486* (2013.01); *B60L 2240/12* (2013.01); *B65H 2701/34* (2013.01)
USPC ................. 701/22; 701/36; 701/49; 700/255; 700/260

(58) Field of Classification Search
None
See application file for complete search history.

(56) References Cited

U.S. PATENT DOCUMENTS

| | | | | |
|---|---|---|---|---|
| 2,628,791 | A | | 2/1953 | Lee |
| 4,258,834 | A | * | 3/1981 | Hawley et al. ........... 191/12.2 R |
| 4,511,100 | A | | 4/1985 | Oetringhaus |
| 4,700,023 | A | | 10/1987 | Hillmann et al. |
| 5,385,314 | A | | 1/1995 | Hughes |
| 5,430,665 | A | * | 7/1995 | Jin et al. ...................... 702/163 |
| 5,502,358 | A | * | 3/1996 | Lee .................................. 318/6 |
| 5,546,672 | A | * | 8/1996 | Campbell et al. .............. 33/716 |
| 5,551,545 | A | * | 9/1996 | Gelfman .................. 191/12.2 A |

(Continued)

FOREIGN PATENT DOCUMENTS

| | | |
|---|---|---|
| EP | 1003088 | 5/2000 |
| FI | 75453 B | 2/1988 |
| WO | 2011049747 | 4/2011 |

OTHER PUBLICATIONS

British Search Report in Application No. GB1101003.0, dated May 25, 2011, 3 pages.

(Continued)

*Primary Examiner* — Khoi Tran
*Assistant Examiner* — Bao Long T Nguyen
(74) *Attorney, Agent, or Firm* — Michael Best & Friedrich LLP

(57) ABSTRACT

A device for reducing damage to an electric vehicle powered by a trailing cable, the device including an electric sensor for determining the mobile equipment's position relative to a hazard, and an electric controller responsive to the electrical means for operating a motor to change the operation of the electric vehicle to reduce the likelihood of adverse effects to the trailing cable if the electric vehicle's position is near the hazard.

21 Claims, 3 Drawing Sheets

(56) References Cited

U.S. PATENT DOCUMENTS

| | | | |
|---|---|---|---|
| 5,634,237 A | 6/1997 | Paranjpe | |
| 5,647,554 A * | 7/1997 | Ikegami et al. | 242/390.9 |
| 5,703,297 A | 12/1997 | Bauer | |
| 5,841,259 A | 11/1998 | Kim et al. | |
| 6,113,343 A * | 9/2000 | Goldenberg et al. | 414/729 |
| 6,530,537 B2 | 3/2003 | Hanlon | |
| 6,725,986 B2 | 4/2004 | Reindle et al. | |
| 7,331,436 B1 * | 2/2008 | Pack et al. | 191/12.2 A |
| 7,501,780 B2 * | 3/2009 | Yamamoto | 318/587 |
| 7,793,442 B2 * | 9/2010 | Koch et al. | 37/413 |
| 7,873,437 B2 * | 1/2011 | Aldred et al. | 700/253 |
| 2006/0150361 A1 | 7/2006 | Aldred et al. | |
| 2006/0229765 A1 * | 10/2006 | Bommer et al. | 700/245 |
| 2009/0266664 A1 * | 10/2009 | Everett et al. | 191/12 |
| 2009/0281658 A1 * | 11/2009 | Huttenberger et al. | 700/245 |
| 2009/0306823 A1 * | 12/2009 | Baltes et al. | 700/245 |
| 2010/0300826 A1 | 12/2010 | Peterson et al. | |

OTHER PUBLICATIONS

First Office Action from the Australian Intellectual Property Office for Application No. 2011200255 dated Apr. 9, 2013 (3 pages).
AU2011200255 Patent Examination No. 2 dated Aug. 5, 2013 (2 pages).
Examination Report from the UK Intellectual Property Office for British Application No. GB1101003.0 dated Jan. 23, 2014 (5 pages).
Examination Report from the United Kingdom Intellectual Property Office for Application No. GB1101003.0 dated Jul. 7, 2014 (2 pages).
First Office Action from The State Intellectual Property Office of the People's Republic of China for Chinese Application No. 201110072429.8 dated May 30, 2014 (19 pages).

* cited by examiner

DEVICE FOR REDUCING THE LIKELIHOOD OF DAMAGE TO A TRAILING CABLE

BACKGROUND

This disclosure relates to movable electric machinery having a trailing cable connected to a source of power.

Current shuttle cars include a trailing cable reel or drum driven by an electric motor or hydraulic motor, controlled by an electronic controller.

An RFD device is currently used as a mobile tag with a stationary transmitter/receiver. One of the common uses of RFID technology is collecting tolls on highways or bridges. A transmitter/reader located at a toll booth detects an approaching vehicle that has a RFID tag. The "tag" is an antenna and an electronic chip. When the tag comes within range of the transmitter, it returns a signal identifying itself. If the transmitter/reader recognizes it as a valid account, it collects the toll electronically and allows the vehicle to pass.

The trailing cable of a shuttle car is a consumable item and constitutes a major portion of the total cost of ownership of the machine. The trailing cable can be damaged in several ways, one of which is by subjecting it to high levels of tensile stress as the shuttle car travels past the fixed trailing cable tie-off point. The high stress levels are caused by the trailing cable having to reverse the direction of the fully laden and thus very heavy cable reel drum over a very short period of time as the shuttle car passes the fixed tie-off or anchor point. More specifically, the trailing cable length is short as the shuttle car nears the tie-off point, but as it passes and the cable again needs to be let out, the cable drum needs to reverse direction. If the push and pull on the cable drum is handled only by the cable, substantial stress on the cable is the result.

SUMMARY

One of the objects of this disclosure is to provide a reliable indication of the shuttle car's position relative to some known position, such as the trailing cable tie-off or anchor point.

Another of the objects of this disclosure is to provide the energy required to change the drum direction by other than the trailing cable, such as by a trailing cable reel drum motor, or by reducing the speed of the shuttle car. This will reduce the instances of cable damage and reduce the overall operating cost of a shuttle car.

This disclosure provides a device for reducing damage to mobile equipment powered by a trailing cable, the device including an electric sensor for determining the mobile equipment's position relative to a hazard, and an electric controller responsive to the electrical means for operating a motor to change the operation of the mobile equipment to reduce the likelihood of adverse effects to the trailing cable if the mobile equipment's position is near the hazard.

Figure 1:
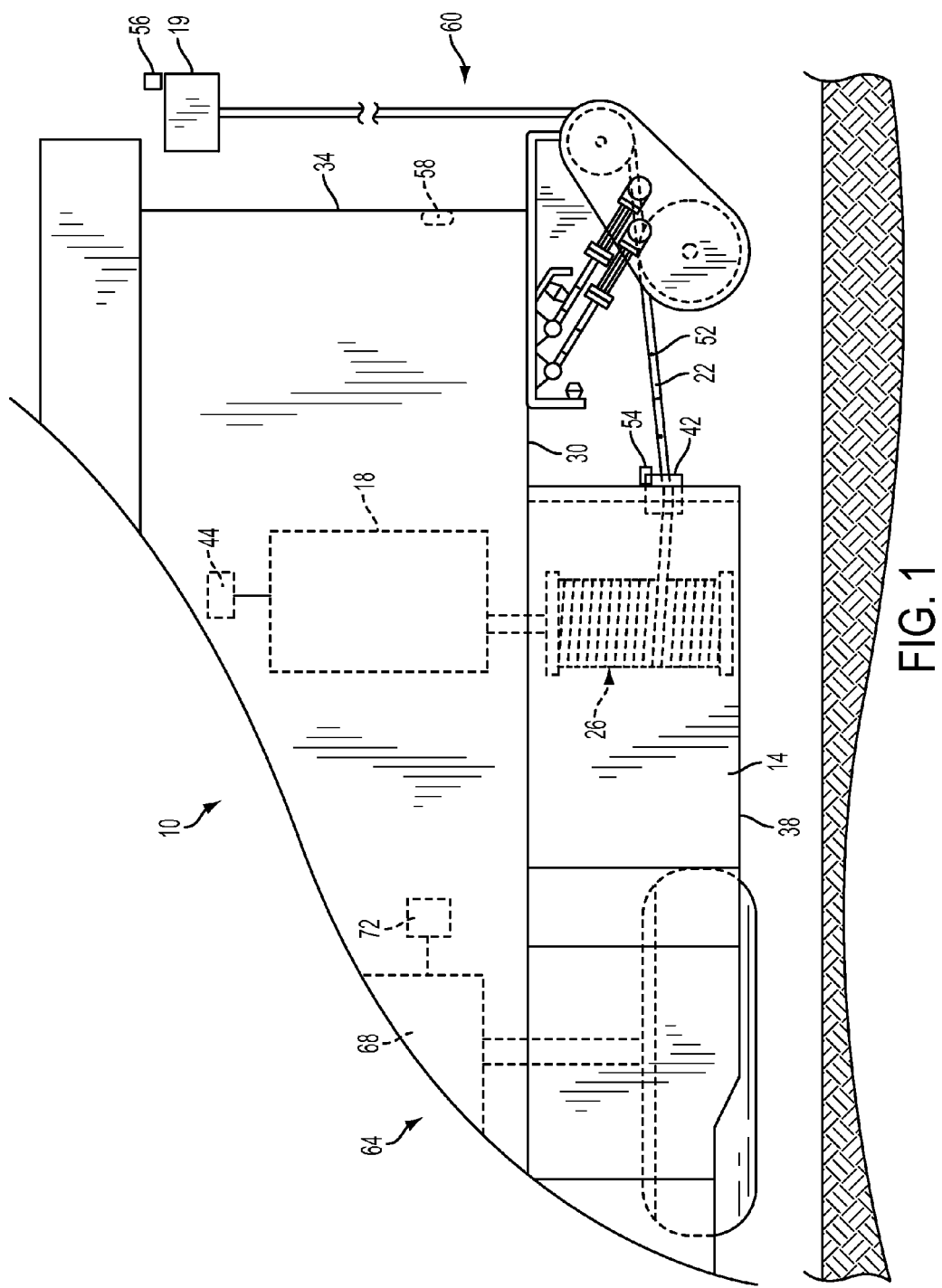
FIG. 1 is a partial top view of the left rear corner of a shuttle car.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

DESCRIPTION OF THE PREFERRED EMBODIMENT

An electric vehicle 10 in the form of a shuttle car useful in hauling material in underground mines is shown in FIG. 1. The shuttle car 10 includes a vehicle frame 14, an electrical or hydraulic motor 18 on the frame 14, and a cable 22, electrically connected to the motor 18 and adapted to be connected to a source of power 19. The shuttle car 10 further includes a reel 26 on the frame 14 between the electric motor 18 and one end of the frame 14. More specifically, the reel 26 is located near the discharge end 30 of the shuttle car 10 and the reel 26 provides for storage of the cable 22. The cable reel 26 is rotatable by the cable reel motor 18 that is controlled by a cable reel controller 44.

As the shuttle car 10 moves backwards, forwards, and around corners, toward to or away from the power source, the cable 22 is either wound onto or paid out of the reel 26. The cable 22 extends from the rear 34 of the shuttle car 10, and, at times, either runs along the side 38 of the shuttle car 10, when the shuttle car 10 is moving backwards, or extends straight back from the shuttle car 10, when the shuttle car 10 is moving forward (not shown). When the shuttle car moves right around a corner, as shown in FIG. 1, the cable 22 runs along the rear 34 of the shuttle car 10. In many applications, the cable 22 can be between 500 and 750 feet long.

The shuttle car 10 further includes a cable guide 42 between the reel 26 and the rear 34 of the shuttle car 10, and a sheave bracket assembly 46 mounted on the left rear 30 of the shuttle car 10.

Figure 2:
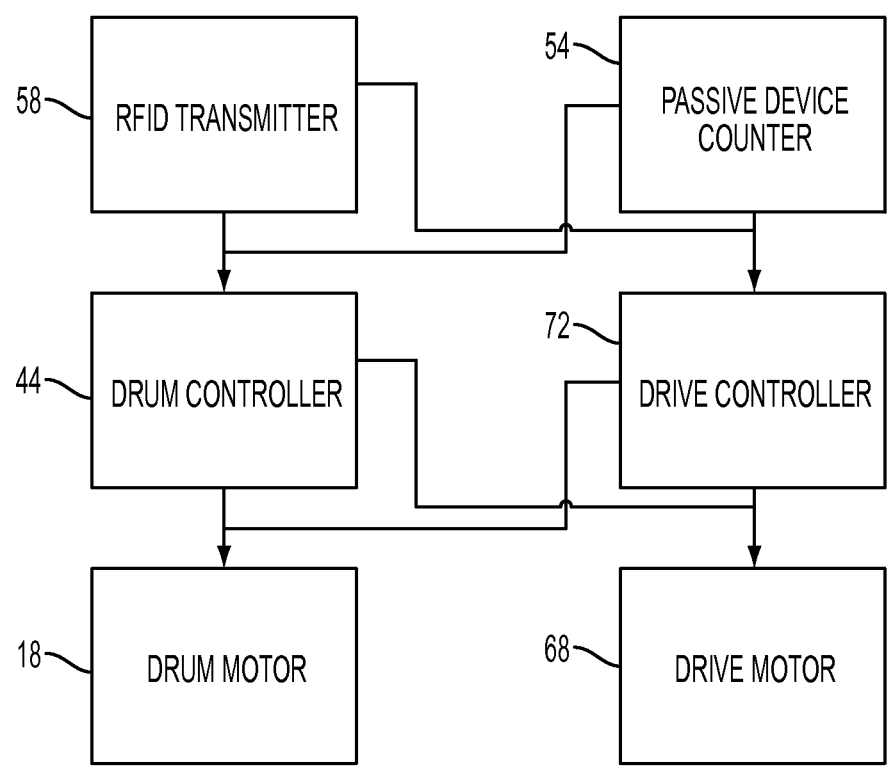
FIG. 2 is a schematic view of the shuttle car electric sensor and electric controllers according to this disclosure.
Figure 3:
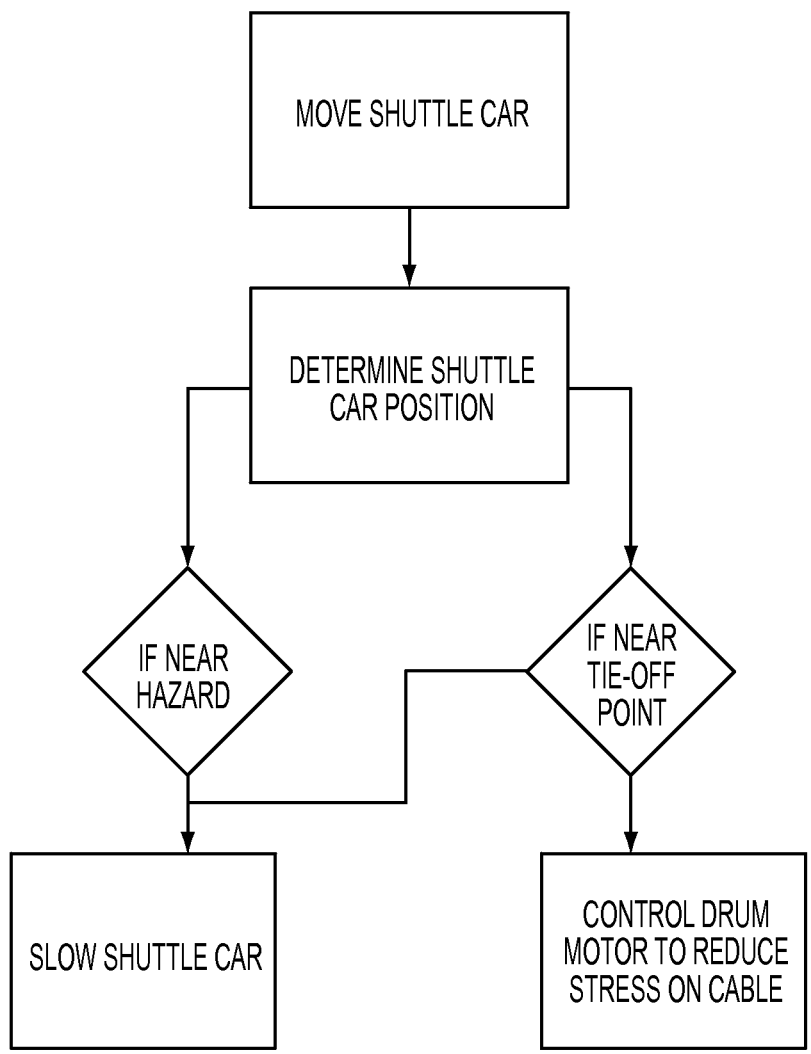
FIG. 3 is a schematic view of the operation of a device for reducing damage to the shuttle car according to this disclosure.

As illustrated in FIGS. 1 through 3, the shuttle car 10 further includes a device 60 for reducing damage to the shuttle car trailing cable 22. The shuttle car 10 also includes a drive system 64 for moving the vehicle over a surface by operating a drive motor 68 controlled by a motor controller 72.

The trailing cable damage reducing device 60 comprises electrical means in the form of an electrical sensor for determining the mobile equipment's position relative to a hazard. More particularly, in one embodiment, the electrical sensor is sensing means for sensing a mobile equipment's position, the sensing means including passive devices 52 attached at regular intervals to the trailing cable 22, means 54 for sensing the passing of the passive devices, and for counting the number of such intervals to determine the amount of paying out or winding in of the trailing cable 22.

In yet another embodiment, the electrical sensor is a radio frequency identification (RFID) tag 56 located at a hazard, such as at the cable anchor point 19, or by a ventilation curtain or a blind corner, and a transmitter/reader 58 on the electric vehicle 10 responsive to the RFID tag 56 to determine the vehicle's presence near the RFID tag 56.

The device 60 also includes control means in the form of an electrical controller responsive to the position sensor for operating a motor to change the operation of the shuttle car to reduce the likelihood of adverse effects to the trailing cable if the shuttle car's position is near the hazard.

More particularly, in one embodiment, the control means comprises a drive motor control 72 operable connected to the drive motor 68 for affecting the speed of the shuttle car.

In another embodiment, the control means comprises a reel winding motor control 44 operable connected to the reel winding motor 18 for affecting the direction of the force applied to the cable reel and thus the amount of paying out or winding in of the trailing cable.

More particularly, in still another embodiment, the control means comprises the reel winding motor control 44 operable connected to the reel winding motor 18 for affecting the amount of the force applied to the cable reel and thus the amount of paying out or winding in of the trailing cable 22. The three above control means can be operated independently or together.

In other words, two means are disclosed for providing input to a drum motor controller 44 or a shuttle car drive motor 68. One such means is the device 54 for determining how much of the cable 22 has been paid in or out of the reel 26 by collecting such information by monitoring the passive transmitting devices 52, such as permanent magnets, placed at regular intervals along the length of a shuttle car trailing cable 22. The detector 54, such as a Hall effect sensor, located on the shuttle car 10, senses these transmitters 52 as the cable 22 passes the detector 54, and provides this information to the control means. The control means counts up the number of transmitters 52 detected on the cable 22 as the cable is reeled off the cable reel 26, starting with the shuttle car 10 located next to the fixed cable tie-off point 19, and can then count down the number of transmitters 52 as the cable 22 is reeled back onto the cable reel 26 in order to determine the shuttle car's approximate distance from the fixed tie-off point 19. The control means then uses the approximated distance from the fixed tie-off point 19 to proactively slow down the cable reel 26 or reverse its direction in such a way that the trailing cable itself is not subjected to high levels of tensile stress when the shuttle car 10 passes the fixed tie-off point (cable anchor point).

The same equipment can also be used to provide an approximate measure of the shuttle car's instantaneous speed. This could be recorded on a data-logging device (not shown) and/or transmitted in real-time from the machine in order to provide information on the shuttle cars performance during an operating shift. The control means can also slow down the shuttle car speed of travel, if needed, when approaching the fixed tie-off point.

The other electrical means is to place the RFID tags 56 at appropriate mine locations, such as at the cable anchor point 19, or by a ventilation curtain or a blind corner. The transmitter/reader 58 interfaces with the control means. This eliminates human error in setting various points along the path of the shuttle car 10.

Forcing a shuttle car operator to slow down while passing the cable tie off lowers stress and wear on the trailing cable, lowering cable cost and repair. Another example would be to locate tag where the machine passes through ventilation curtains or blind corners, automatically triggering a limited speed and an audible or visual warning (sound horn, flash lights) from the machine without operator input. This warning could alert nearby miners on foot, or other equipment operators, of the moving equipment and prompt them to take evasive action if needed.

By mounting and powering an RFID transmitter/reader on the shuttle car and placing the RFID tag at strategic locations, the vehicle can identify tag response, and machine functions can then be controlled based on the proximity of the vehicle to the tag. By placing the RFID tag near a shuttle car's cable anchor point, the control means can limit that specific vehicle's speed while passing its anchor point. A different shuttle car not using that anchor could ignore the tag response and pass unaffected.

Various other features of this disclosure are set forth in the following claims.

The invention claimed is:

1. A shuttle car comprising:
   a frame for hauling mined material and supported for movement in a mine;
   a drive motor driving a mechanism for moving the shuttle car;
   a cable connected to a power source and providing power to the drive motor;
   a reel for reeling in and paying out the cable, the reel being rotated by a winding motor;
   a sensor for detecting a position of the shuttle car relative to at least one of a hazard and a tie-off point; and
   a controller configured to receive the position detected by the sensor, the controller modifying a speed of the drive motor and a speed of the winding motor when the position is within a predetermined distance with respect to one of the hazard and the tie-off point.

2. The shuttle car of claim 1, wherein the sensor includes a plurality of passive transmitters coupled to the cable at regular intervals, and a detector positioned proximate the cable, the detector counting the number of passive transmitters that pass the detector as the cable is reeled in or paid out.

3. The shuttle car of claim 1, wherein the sensor includes an RFID tag located at a hazard and a reader positioned on the shuttle car, the reader detecting the RFID tag to determine the presence of the hazard.

4. The shuttle car of claim 1, wherein the controller is configured to modify a direction of rotation of the winding motor when the position is within a predetermined distance with respect to the tie-off point.

5. The shuttle car of claim 2, wherein the sensor approximates a distance of the shuttle car from the tie-off point based on the number of passive transmitters counted by the detector.

6. The shuttle car of claim 2, wherein each passive transmitter includes a magnet, and the detector includes a Hall effect sensor.

7. The shuttle car of claim 5, wherein the controller adjusts the speed of the winding motor based on the approximated distance from the tie-off point.

8. The shuttle car of claim 5, wherein the controller reduces the speed of the drive motor and the speed of the winding motor as the shuttle car approaches the tie-off point.

9. A system for controlling operation of a mining machine, the mining machine including a frame for hauling mined material, a drive motor, a cable connected to a power source and providing power to the drive motor, a reel for reeling in and paying out the cable, and a winding motor for rotating the reel, the system comprising:
   a sensor for detecting a position of the mining machine relative to a tie-off point; and
   a controller configured to receive the position detected by the sensor, the controller modifying a speed of the drive motor and a speed of the winding motor when the position is within a predetermined distance with respect to the tie-off point.

10. The system of claim 9, wherein the sensor includes a plurality of passive transmitters coupled to the cable at regular intervals, and a detector positioned proximate the cable, the detector counting the number of passive transmitters that pass the detector as the cable is reeled in or paid out.

11. The system of claim 9, wherein the controller is configured to modify a direction of rotation of the winding motor when the position is within a predetermined distance with respect to the tie-off point.

12. The system of claim 10, wherein the sensor approximates a distance of the shuttle car from the tie-off point based on the number of passive transmitters counted by the detector.

13. The system of claim 10, wherein each passive transmitter includes a magnet, and the detector includes a Hall effect sensor.

14. The system of claim 12, wherein the controller adjusts the speed of the winding motor based on the approximated distance from the tie-off point.

15. The system of claim 12, wherein the controller reduces the speed of the drive motor and the speed of the winding motor as the shuttle car approaches the tie-off point.

16. A shuttle car comprising:
a frame for hauling mined material and supported for movement in a mine;
a drive motor driving a mechanism for moving the shuttle car;
a cable connected to a power source and providing power to the drive motor;
a reel for reeling in and paying out the cable, the reel being rotated by a winding motor;
a sensor including an RFID tag positioned proximate a hazard and a reader positioned on the shuttle car, the reader detecting the RFID tag to determine the presence of the hazard; and
a controller configured to receive a signal indicating the presence of the hazard, the controller reducing a speed of the drive motor and a speed of the winding motor in response to the detection of the RFID tag by the reader.

17. The shuttle car of claim 16, further comprising a second sensor, the second sensor including a plurality of passive transmitters coupled to the cable at regular intervals and a detector positioned proximate the cable, the detector counting the number of passive transmitters that pass the detector as the cable is reeled in or paid out.

18. The shuttle car of claim 17, wherein the second sensor approximates a distance of the shuttle car from a tie-off point based on the number of passive transmitters counted by the detector.

19. The shuttle car of claim 17, wherein each passive transmitter includes a magnet, and the detector includes a Hall effect sensor.

20. The shuttle car of claim 18, wherein the controller adjusts the speed of the winding motor based on the approximated distance from the tie-off point.

21. The shuttle car of claim 18, wherein the controller reduces the speed of the drive motor and the speed of the winding motor as the shuttle car approaches the tie-off point.

* * * * *